Figure 3:
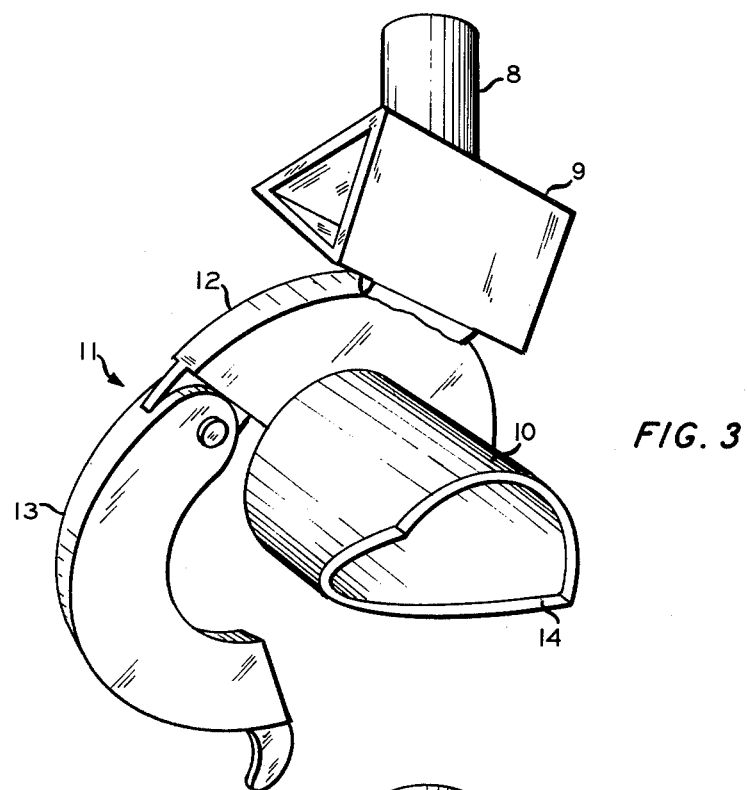

United States Patent [19]

Carroll et al.

[11] 4,174,248
[45] Nov. 13, 1979

[54] PROCESS AND APPARATUS FOR CONNECTING PLASTIC PIPES

[75] Inventors: James C. Carroll, Hopkinsville, Ky.; Clel H. Shafer, Perryton, Tex.

[73] Assignee: Phillips Petroleum Company, Bartlesville, Okla.

[21] Appl. No.: 954,157

[22] Filed: Oct. 24, 1978

Related U.S. Application Data

[62] Division of Ser. No. 621,887, Oct. 14, 1975, abandoned.

[51] Int. Cl.² .............................................. B32B 31/00
[52] U.S. Cl. ..................................... 156/538; 156/499
[58] Field of Search ............... 156/253, 258, 257, 304, 156/538, 539, 499

[56] References Cited

U.S. PATENT DOCUMENTS

| | | | |
|---|---|---|---|
| 2,973,296 | 2/1961 | Webber | 156/253 |
| 3,013,925 | 12/1961 | Larsen | 156/258 |
| 3,633,167 | 1/1972 | Plontke | 156/257 |
| 3,907,625 | 9/1975 | Vogelsanger | 156/253 |

*Primary Examiner*—Douglas J. Drummond

[57] ABSTRACT

In an apparatus for connecting a lateral pipe to a main pipe, first and second pipe holding means are provided which are connected by means to move one of the pipe holding means towards the other. The pipe holding means for holding the lateral pipe has a guiding sleeve, which at one of its ends has essentially the configuration of the outer surface of the main pipe. The pipes are connected by placing the lateral pipe into said guiding sleeve, heating the end of the lateral pipe that is shaped to fit onto the outside of the main pipe, heating the main pipe at least in the area where the lateral pipe is contacting the main pipe and bringing the two heated areas in firm contact.

6 Claims, 4 Drawing Figures

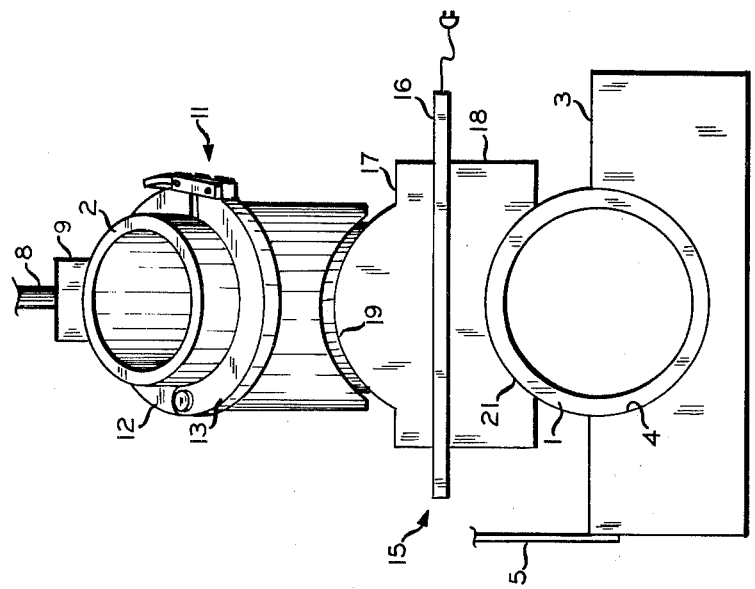
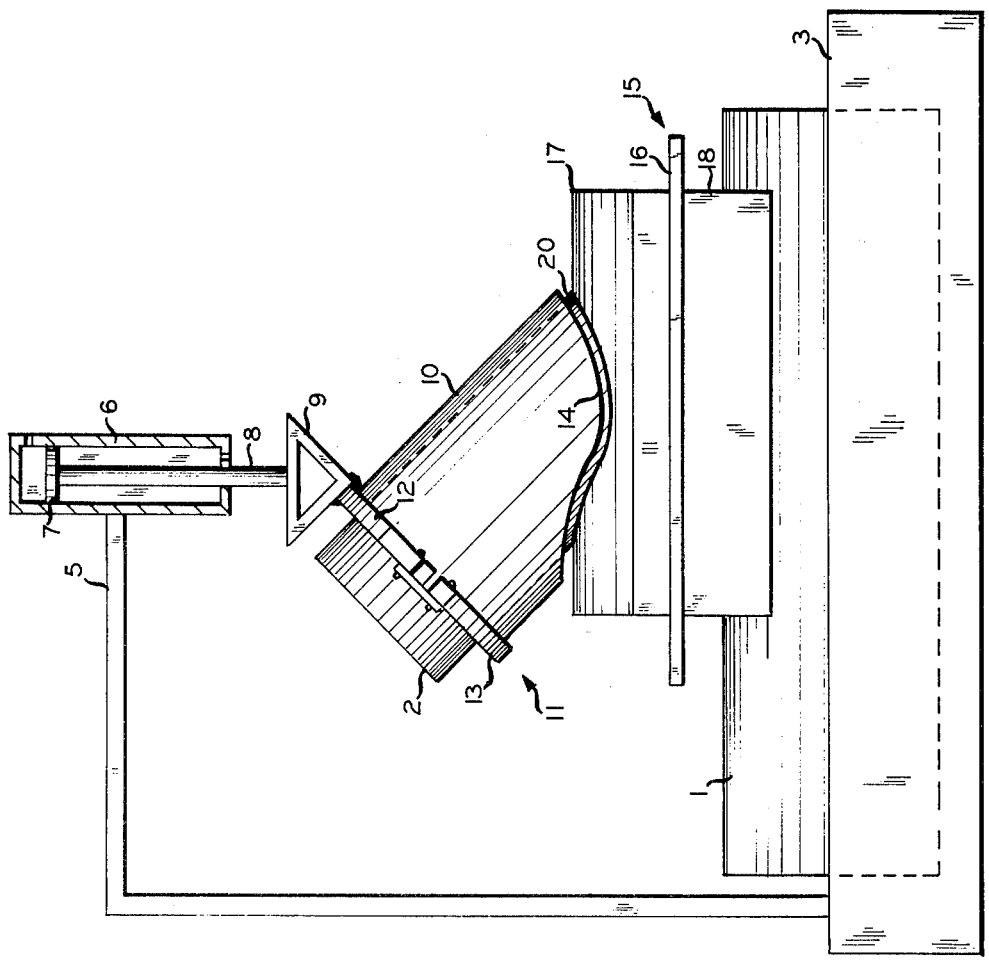

PROCESS AND APPARATUS FOR CONNECTING PLASTIC PIPES

This application is a division of application Ser. No. 621,887, filed Oct. 14, 1975 now abandoned.

This invention relates to connecting pipes. In one of its aspects, this invention relates to an apparatus for connecting a lateral pipe to a main pipe, both pipes having similar diameters. In another aspect, this invention relates to a process of connecting a lateral pipe to a main pipe, said pipes consisting essentially of polyolefin.

BACKGROUND OF THE INVENTION

Polyolefin pipes have been used in the past for various applications. Because of the resistance of this polymer material against various chemicals, such polyolefin pipes have found widespread use for sewer lines or for linings for sewer lines. More and more these pipes are also being used for various chemicals and liquids containing aggressive materials.

It has also been proposed in the art to produce T- or Y-shaped pipe connectors made from polyolefin. One such process uses a double-sleeve tool in which a small lateral pipe is arranged between an inner and an outer sleeve. The outer sleeve is preheated. The end of the lateral pipe is heated to welding temperature and also the large main pipe is heated in an annulus to welding temperature. Then the lateral pipe is pressed onto the large main pipe to achieve welding-type connection. The two sleeves are pressed down to further improve this welding-type connection. This process has been disclosed for the connection of a lateral pipe that is considerably smaller than the main pipe.

It would be desirable to have available an apparatus for producing pipe connections which is simple and reliable and can be used without major changes for varying pipe diameters and varying angles between the lateral and the main pipe. Furthermore, it would be desirable to have such an apparatus available with which pipe connections can be produced, in which the lateral pipe has a diameter which is approximately the same as that of the main pipe.

THE INVENTION

It is thus one object of this invention to provide an apparatus for connecting a lateral plastic pipe to a main plastic pipe.

Another object of this invention is to provide an apparatus for connecting a lateral polyolefin pipe to a main polyolefin pipe, both pipes having approximately the same diameter.

Still a further object of this invention is to provide a new process for connecting a lateral plastic pipe and a main plastic pipe.

Figure 4:
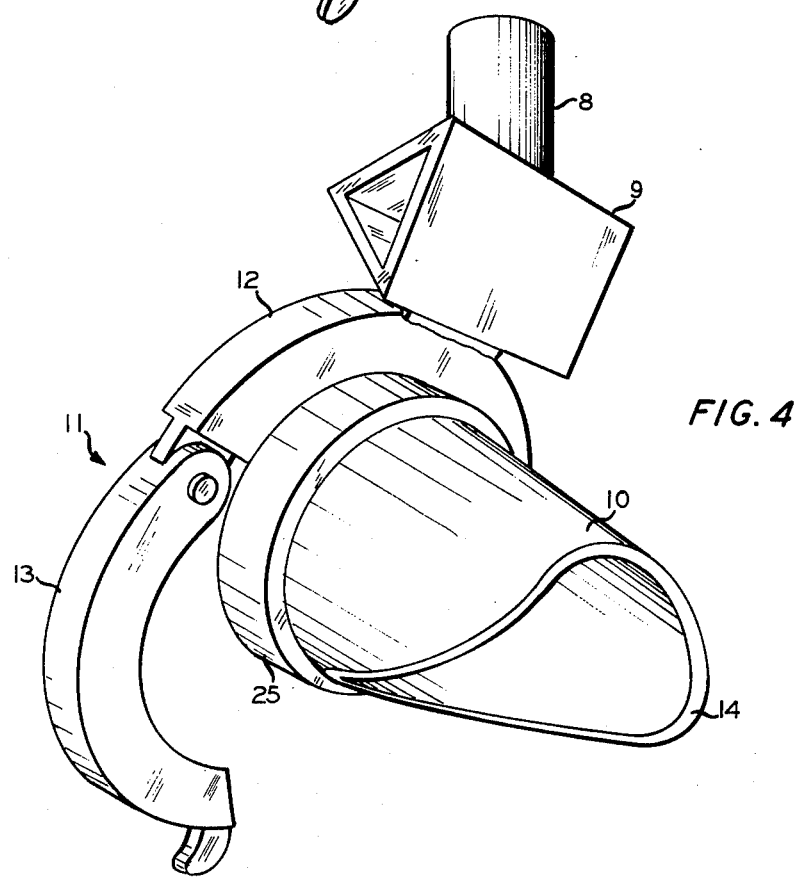

These and other objects, features, advantages and embodiments of this invention will become apparent to those skilled in the art from the following description of the invention, the appended claims and the drawing, in which:

FIGS. 1 and 2 show two views of the pipe connecting apparatus with a heating unit, FIGS. 3 and 4 show perspective views of holding means for the lateral pipe with different guiding sleeves.

A particular problem exists in the art of connecting plastic pipes of similar diameter to make Y- or T-shaped connections. It was found that the end of the lateral pipe, when configured to fit on the main pipe after heating to a welding temperature, spread apart along the main pipe and failed in some instances to provide a proper connection.

In accordance with this invention and to solve this problem, we have now provided an apparatus for connecting a lateral pipe to a main pipe comprising holding means for the main pipe and holding means for the lateral pipe, which are connected to each other by moving means via which the two pipe holding means can be moved with respect to each other, and the lateral pipe and the main pipe can be brought into contact with each other; the holding means for the lateral pipe consists essentially of a guiding sleeve having an inner configuration essentially equal to the outer configuration of the lateral pipe, one end of said guiding sleeve having essentially the configuration of the outer surface of the main pipe. The edge of the guiding sleeve thus has approximately the configuration of the intersecting line of a cylinder having a diameter equal to the outer diameter of the main pipe and a cylinder having an outer diameter equal to the internal diameter of the guiding sleeve, with the further provision that the two cylinders are in the same position with respect to each other as the main pipe and the lateral pipe in the final pipe connection. The apparatus of this invention does not have any means to hold or guide the inside of the lateral pipe. In accordance with this invention, it has now been found that by using the specifically shaped sleeve on the outside only, in a very simple and effective manner, the problem mentioned above can be solved and reliable connections between the lateral pipe and the main pipe, made from polyolefin to be defined later, could be made. The apparatus, not having any internal guiding means for the lateral pipe, has the further advantage of being rather inexpensive and being readily adaptable to varying angles and pipe diameters of the lateral pipe and the main pipe, the simple construction avoiding any internal guidance for the lateral pipe is made possible.

The present invention is applicable to pipe connections in which the ratio of the internal diameter of the guiding sleeve to the external diameter of the main pipe is in the range between $\frac{2}{3}$ and 1. A preferred range for this diameter range, in which the problem of imperfect contact along the intersecting line between the two pipes becomes particularly aggravating and the solution of this invention becomes particularly desirable, is 0.7 to 1.0.

The present invention is applicable to connection of lateral pipes to main pipes at any usually employed angle. The smaller the angle between the lateral pipe and the main pipe becomes, the more severe the problem discussed above of imperfect contact becomes. However, the invention can be used at angles of 15°–90° and with particular advantage when the lateral pipe forms an angle of 15° to 45° with the main pipe.

Typically and preferably used ranges for the diameters of the main pipe and the lateral pipe, as well as for the wall thickness of the pipes, are shown in the following table.

|  | Typical Range | | Preferred Range | |
| --- | --- | --- | --- | --- |
|  | Inches | Centimeters | Inches | Centimeters |
| External diameter of main pipe | 4–36 | 10–91 | 6–24 | 15.2–61 |
| Wall thickness of main pipe | $\frac{1}{4}$–1$\frac{1}{4}$ | 0.6–3.2 | $\frac{5}{8}$–$\frac{3}{4}$ | 1.6–1.9 |
| External diameter of lateral pipe | 3–36 | 7.6–91 | 4–24 | 10–61 |

-continued

| | Typical Range | | Preferred Range | |
|---|---|---|---|---|
| | Inches | Centimeters | Inches | Centimeters |
| Wall thickness of lateral pipe | ¼–1¼ | 0.6–3.2 | ⅝–¾ | 1.6–1.9 |

The ranges shown in the table are those commonly employed for pipes made of uncrosslinked high density polyolefins.

In order to hold the lateral pipe inside of the guiding sleeve and to prevent it from sliding in this sleeve, various means such as one or more bolts through the sleeve, the ends of which can be pressed onto the lateral pipe, can be used. It is, however, presently preferred to employ a standard clamp consisting of two pivotally connected halves. The clamp is attached to the sleeve. The latter is done by attaching one of the halves to the sleeve, the other half being loose can be put around the pipe in order to clamp the pipe in position. It is also possible to have both halves of the clamp rotatably arranged around a hinge pin which in turn is attached to the sleeve.

In accordance with a preferred embodiment and for all general applications, the axis of the lateral pipe and the axis of the main pipe intersect and are located in one plane. Thus, also the axis of the guiding sleeve and the axis of the main pipe, when the guiding sleeve with the lateral pipe is in the desired position, intersect and are located in one plane. These axes form the same angle as the angle between the lateral pipe and the main pipe of the desired pipe connection.

The means to apply a motion between the first pipe holding means for holding the main pipe and the second pipe holding means for holding the lateral pipe can be of any desired construction. Presently preferred are those means that allow to apply a straight line motion between the two pipe holding means. Such means, therefore, can comprise a rod sliding in a bearing and being actuated, e.g., by hydraulic piston. Another possibility would be a threaded rod to which the lateral pipe holding means are attached, which is guided in a rotatably arranged nut, said rod being secured against rotation and said nut being secured against longitudinal movement.

Still another embodiment of this invention consists in a process for connecting a lateral plastic pipe and a main plastic pipe. In this process, a main pipe and a lateral pipe are used, which both consist essentially of uncrosslinked polyolefins made from 1-olefins having 2–8 carbon atoms per molecule or an uncrosslinked copolymer of these 1-olefins. The presently preferred polyolefins have a weight average molecular weight in the range of about 200,000 to about 1,000,000. High density polyethylene and copolymers of ethylene with 2 to 8 mole percent of 1-hexene or 1-butene or mixtures thereof are the preferred polyolefins. The ratio of the external diameter (d) of the lateral pipe to the external diameter (D) of the main pipe is from ⅜ up to 1. The end of the lateral pipe is shaped to fit onto the contour of the main pipe; an apparatus as disclosed above is used; the lateral pipe is inserted into the guiding sleeve of the apparatus; the shaped end of the lateral pipe, as well as the area of the main pipe in which the lateral pipe will contact the main pipe, are heated. The temperature to which the sections of the pipe are heated is such that the polyolefin will be tacky and will flow slowly under the applied pressure but not sufficient to completely melt the end, i.e., have a tendency to drip or form droplets. This temperature will vary somewhat with the polyolefins, molecular weight and type of filler which may be present. Generally, for the polyolefins used in pipe construction, it will be in the range of 300°–450° F. (149°–232° C.), preferably 325°–400° F. (163°–204° C.). The two pipe holding means of the apparatus are moved towards each other so that the lateral pipe and the main pipe come into contact with their softened areas, thus forming a welding-type connection between the lateral and the main pipe; the pipe connection is thereafter removed from the apparatus.

The lateral pipe and the main pipe are made from uncrosslinked high-density polyethylene selected from the group consisting of polyethylene and copolymers of ethylene and a small quantity (2 to 8 mole percent in the copolymer) of 1-butene and/or 1-hexene. These polyolefins can be further defined by their properties as follows: Density in the range of 0.95–0.96 (determined in accordance with ASTM D 1505-68), melt index in the range of 1.0 to 2.00 g/10 min. (ASTM D 1238-70 cond. F).

Although the connection achieved by the process of this invention generally is both mechanically sufficiently strong and sufficiently tight, an additional welding seam can be made along the area where the two pipes intersect by standard means, e.g., a welding rod.

In accordance with a presently preferred embodiment of this invention, the shaped end of the lateral pipe protruding in a small axial distance from the guiding sleeve and the area of contact of the main pipe are simultaneously heated by sandwiching a contoured convex/concave heating element between the main pipe and the lateral pipe. This heating element has one heated surface being convex and having the contour of the main pipe contacting the shaped end of the lateral pipe and one heated surface being concave having also the contour of the main pipe and contacting the main pipe.

Further embodiments and details of this invention will become apparent from the following description of the drawing.

In FIGS. 1 and 2 there is shown an apparatus for connecting a main pipe 1 to a lateral pipe 2. The main pipe 1 is arranged on a pipe support 3, having a cylindrically shaped concave recess 4, having essentially the contour of the main pipe 1. Within this recess 4, the main pipe 1 is arranged.

A frame 5 is connected to the pipe support 3 and to this frame a hydraulic cylinder 6 is attached. Within this hydraulic cylinder 6, a piston 7 is arranged for a sliding vertical motion. This piston 7, in turn, is connected to a rod 8. To the end of the rod 8, second pipe holding means are attached via an angle piece 9. A guiding cylinder 10 is welded to this angle piece 9. Also welded to the angle piece 9 and the cylinder 10 is a clamp 11 consisting of two individually connected halves 12 and 13. The clamp 11 holds the pipe 2 from any axial movement within the guiding cylinder 10.

The guiding cylinder 10 has an edge 14, which is shaped approximately like the intersecting line between the main pipe 1 and the lateral pipe 2 in the final position.

Sandwiched between the two pipe holding means there is arranged a heating unit 15. This heating unit consists of a heating plate 16 and two heating shoes 17 and 18. The upper heating shoe 17 has a convex-shaped section 19, which has the same contour as the main pipe 1 and contacts the shaped edge 20 of the lateral pipe 2, which protrudes by a small axial distance from the guiding cylinder 10. The heating shoe 18 has a concave section 21, which contacts the main pipe 1 and heats the surface of the main pipe in the area of connection, i.e. the area in which the pipe 2 comes into contact with pipe 1 during the final connection step. Both shoes 17 and 18 are heated from the same heating plate 16.

FIGS. 3 and 4 show two guiding sleeves 10, one having a reinforcing ring 25 at the rear end to which the clamp 11 is attached. These examples show two shapes the edges 14 can have depending upon the ratio of the external diameters of the lateral and the main pipe, as well as upon the angle at which the lateral pipe is intended to be attached to the main pipe.

In order to connect the two pipes 1 and 2, these pipes are placed into the pipe holders 3 and 10. The clamp 11 is closed in order to prevent pipe 2 from sliding axially. The end of the lateral pipe 2, which will contact the main pipe 1 in the connecting area thereof, is shaped to the contour of the main pipe as explained, e.g., by cutting the pipe edge to the desired shape. This shaping step either can be carried out while the pipe 2 is already in the holder 10 or the pipe 2 can be shaped before it is arranged in the guiding sleeve 10. Thereafter the heating unit 15 is placed on top of the main pipe 1 and pipe 2 is lowered on top of the heating unit by actuating the hydralic cylinder 6. After the two sections of the pipes 1 and 2 have been heated to a sufficiently high temperature, in case of Drisco pipe ® 7600 pipe to a temperature of about 375° F., the hydraulic cylinder 6 is actuated in the opposite direction to lift pipe 2 of the heating unit, the heating unit 15 thereafter is removed and the pipe 2 is then lowered again by actuating the hydraulic cylinder 6 and pressed into contact with the softened area of the main pipe 1. The two softened areas of polyethylene pipe flow together and form a strong welding-type connection, although the diameters of the two pipes are the same or nearly the same. Thereafter, the pipe connection made is removed from the apparatus after the connection has sufficiently solidified. For removing the pipe connection, the main pipe support 3 is, e.g., slid to the left in FIG. 1, the clamp 11 is opened and the pipe connection is pulled out of the sleeve 10.

While the pipe connection is still in the apparatus or after removal, a hole is drilled through the wall of the main pipe in the area surrounded by the lateral pipe 2 to establish a fluid communication between the two pipes. It is also possible to drill this hole before connecting the lateral and the main pipe; however, it is presently preferred to do this after the connection has been made.

Reasonable variations and modifications, which will become apparent to those skilled in the art, can be made in this invention without departing from the spirit or scope thereof.

We claim:
1. Apparatus for connecting a lateral pipe to a main pipe comprising
 a. first pipe holding means to hold said main pipe,
 b. second pipe holding means to hold said lateral pipe, said second pipe holding means consisting essentially of
 aa. a guiding sleeve having an inner configuration essentially equal to the outer configuration of said lateral pipe, one end of said guiding sleeve having essentially the configuration of the outer surface of the main pipe, the internal diameter (d) of said guiding sleeve being related to the external diameter (D) of said main pipe by the following inequality:

$$\tfrac{1}{8} \leq d/D \leq 1,$$

bb. means contacting the exterior surface of the lateral pipe to hold said lateral pipe in position in said guiding sleeve,
 c. motion means connecting said first pipe holding means and said second pipe holding means for applying a relative motion between said second pipe holding means and said first pipe holding means so that said lateral pipe and said main pipe can be brought into contact with each other in the desired relative position, in which said one end of said guiding sleeve approximately fits on said main pipe.

2. Apparatus in accordance with claim 1 wherein the shape of said one end of said guiding sleeve corresponds essentially to the intersecting line of a first cylinder having a diameter equal to the external diameter of the main pipe, and a second cylinder having a diameter equal to the internal diameter of said guiding sleeve, when the two cylinders are in the same relative position with respect to each other as the main pipe and the lateral pipe in the final pipe connection.

3. Apparatus in accordance with claim 1 wherein said means to hold said lateral pipe are clamp means to which the other end of said guiding sleeve is attached.

4. Apparatus in accordance with claim 1 wherein said second pipe holding means can be moved along a straight line towards said main pipe.

5. Apparatus in accordance with claim 4 wherein said straight line forms an angle of about 90° with the axis of said main pipe.

6. Apparatus in accordance with claim 1 wherein the axis of said main pipe and the axis of said guiding sleeve are arranged in one plane in the desired position and form the same angle as the main pipe and lateral pipe in the pipe connection.

* * * * *